(12) United States Patent
Ootani

(10) Patent No.: US 8,101,110 B2
(45) Date of Patent: Jan. 24, 2012

(54) METHOD FOR JOINTING RUBBERY-CORE-INSERTED BRAID

(76) Inventor: Takesaburou Ootani, Osaka (JP)

( * ) Notice: Subject to any disclaimer, the term of this patent is extended or adjusted under 35 U.S.C. 154(b) by 0 days.

(21) Appl. No.: 12/491,655

(22) Filed: Jun. 25, 2009

(65) Prior Publication Data

US 2010/0001427 A1  Jan. 7, 2010

(30) Foreign Application Priority Data

Jul. 1, 2008 (JP) .................................. 2008-172025
Feb. 16, 2009 (JP) .................................. 2009-32267

(51) Int. Cl.
*B29C 65/02* (2006.01)
*B29C 65/54* (2006.01)

(52) U.S. Cl. ....................... 264/263; 264/261; 156/304.1

(58) Field of Classification Search ......................... None
See application file for complete search history.

(56) References Cited

U.S. PATENT DOCUMENTS

| | | | | |
|---|---|---|---|---|
| 2,536,173 A * | 1/1951 | Hamilton | ......................... | 156/49 |
| 2,768,105 A * | 10/1956 | Dittmore et al. | ................. | 156/49 |
| 3,226,463 A * | 12/1965 | Wallace | .................... | 264/272.14 |
| 3,666,586 A * | 5/1972 | Lacey | ............................... | 156/98 |
| 4,092,193 A * | 5/1978 | Brooks | ........................... | 156/83 |
| 4,195,106 A * | 3/1980 | Brusselmans | ................. | 428/34.9 |
| 4,490,315 A * | 12/1984 | Charlebois et al. | .......... | 264/40.1 |
| 4,496,795 A * | 1/1985 | Konnik | ........................ | 174/84 R |
| 4,528,419 A * | 7/1985 | Charlebois et al. | .......... | 174/88 R |
| 4,654,474 A * | 3/1987 | Charlebois et al. | .......... | 174/88 R |
| 4,678,866 A * | 7/1987 | Charlebois | ................... | 174/88 R |
| 5,120,905 A * | 6/1992 | Cousin et al. | ............. | 174/113 C |
| 5,351,331 A * | 9/1994 | Chun et al. | ...................... | 385/97 |
| 5,537,742 A * | 7/1996 | Le et al. | .......................... | 29/869 |

FOREIGN PATENT DOCUMENTS

| | | |
|---|---|---|
| JP | 08-308628 | 11/1996 |
| JP | 2002-240154 | 8/2002 |

* cited by examiner

*Primary Examiner* — Edmund H. Lee
(74) *Attorney, Agent, or Firm* — Eckert Seamans Cherin & Mellott, LLC; Kirk D. Houser, Esquire

(57) ABSTRACT

A method for jointing a rubbery-core-inserted braid is provided. In the method, a mold made of a pair of templates is prepared, wherein the templates may be closed in such a manner that trenches can constitute a through hole into which the braid is fittable. The method includes a step of fitting an end of the braid into the trench in one of the templates, while fitting the other end of the braid into the trench, thereby approaching both the ends of the braids each other, a step of interposing a thermoplastic resin between both the ends, and a step of heating and melting the thermoplastic resin in a state where the mold is closed, causing the melted resin to penetrate into the ends of the braids, and solidifying the melted resin, thereby jointing the ends of the braids to each other.

9 Claims, 3 Drawing Sheets

METHOD FOR JOINTING RUBBERY-CORE-INSERTED BRAID

BACKGROUND OF THE INVENTION

1. Field of the Invention

The present invention relates to a method for jointing a rubbery-core-inserted braid. The rubbery-core-inserted braid referred to herein denotes a product wherein the outside of a rubbery core positioned at the center is covered with a braid.

2. Description of the Related Art

In order to cause ends (cut faces) of a rubbery-core-inserted braid to adhere to each other, an adhesive is used, in particular, a quick drying cyanoacrylate based adhesive is used from the viewpoint of productivity. The cut faces denote faces substantially perpendicular to the longitudinal direction of the rubbery core.

However, a rubbery-core-inserted braid (1) is formed in a state where tension is applied to its rubbery core (8). Accordingly, as illustrated in FIG. 5, when a rubbery-core-inserted braid (1) is cut, a rubbery core (8) shrinks slightly so that each of the cut faces of the rubbery core (8) is dented from an outside braid (80). Additionally, the cut faces of the braid (80) are fluffed to be swelled outside. When the cut end faces of the rubbery-core-inserted braid (1) are not made into flat faces in this way, there is caused a problem that an adhesive does not give a sufficient adhesive force between the cut faces.

The end-jointed region based on a cyanoacrylate based adhesive is easily dissolved with acetone, so that the joint is cancelled. Additionally, the cyanoacrylate based adhesive is low in water resistance; thus, when the end-jointed region is immersed in water, the adhesive strength is deteriorated.

Thus, before the rubbery-core-inserted braid (1) is cut, a position which is to be cut is coated and impregnated with an adhesive or some other solidifying agent, or is cooled, to be partially hardened. Thereafter, the hardened region is cut to give flat cut faces, and then the cut faces are caused to adhere onto each other.

However, in the conventional jointing method, wherein the adhesive is used, the cut faces of the rubbery-core-inserted braid are pressed so as to be pushed against each other. Accordingly, when the amount of fibers in the outside braid is large, the braid is hardened in a state where the fibers swell outside. As a result, the external appearance becomes bad so that a commercial value of the product is declined.

The work for butting the cut end faces of the rubbery-core-inserted braid onto each other is required to be quickly and promptly conducted since the quick drying adhesive is used. Thus, a high skill is required for the worker.

SUMMARY OF THE INVENTION

An object of the present invention is to provide a method for jointing a rubbery-core-inserted braid making it possible to solve the above-mentioned problems.

In the method for jointing a rubbery-core-inserted braid of the present invention, ends (11) (12) of a rubbery-core-inserted braid (1) are caused to approach each other, thereby making the ends opposite to each other. Furthermore, a thermoplastic resin (3), or a mixture of a thermoplastic resin and an adhesive is interposed between both the ends (11) (12); the thermoplastic resin (3), or the thermoplastic resin in the mixture is heated and melted in a state where a circumferential wall (25a) corresponding to the contour of end faces of the rubbery-core-inserted braid (1) stretches over the ends of (11) (12) the rubbery-core-inserted braid (1) to surround the ends; the melted resin is caused to penetrate into the ends of the rubbery-core-inserted braid (1); and the melted resin is solidified, thereby jointing the ends (11) (12) of the rubbery-core-inserted braid (1) to each other.

A mold (2) is provided wherein a through hole (25) in which the rubbery-core-inserted braid (1) is tightly fittable is made; and both the ends (11) (12) of the rubbery-core-inserted braid, and the thermoplastic resin (3) or mixture are sealed in the through hole (25), and the ends (11) (12) are jointed to each other.

In the method for jointing a rubbery-core-inserted braid, at the time of heating and melting the thermoplastic resin (3), or the mixture of the thermoplastic resin and the adhesive, causing the melted resin to penetrate into the ends of the rubbery-core-inserted braid (1), and solidifying the melted resin, thereby jointing the ends (11) (12) of the rubbery-core-inserted braid (1), the ends (11) (12) of the rubbery-core-inserted braid, and the gap therebetween, which contain the thermoplastic resin or the mixture, are surrounded by the circumferential wall (25a), which corresponds to the contour of the end faces of the rubbery-core-inserted braid (1). Accordingly, even when fibers of the cut faces of the rubbery-core-inserted braid (1) are fluffed, the fibers can be certainly prevented from extending over the inside diameter of the circumferential wall (25a) to be swelled and solidified. Accordingly, it is not necessarily essential that the ends of the rubbery-core-inserted braid (1) are subjected to an especial treatment to give flat cut faces. As a result, a labor for pretreatment of the ends of the rubbery-core-inserted braid (1) can be omitted.

Moreover, the through hole (25) in the mold (2) functions as the circumferential wall (25a), so that the same advantageous effects are produced.

DETAILED DESCRIPTION OF THE PREFERRED EMBODIMENTS

First Embodiment

Figure 1:
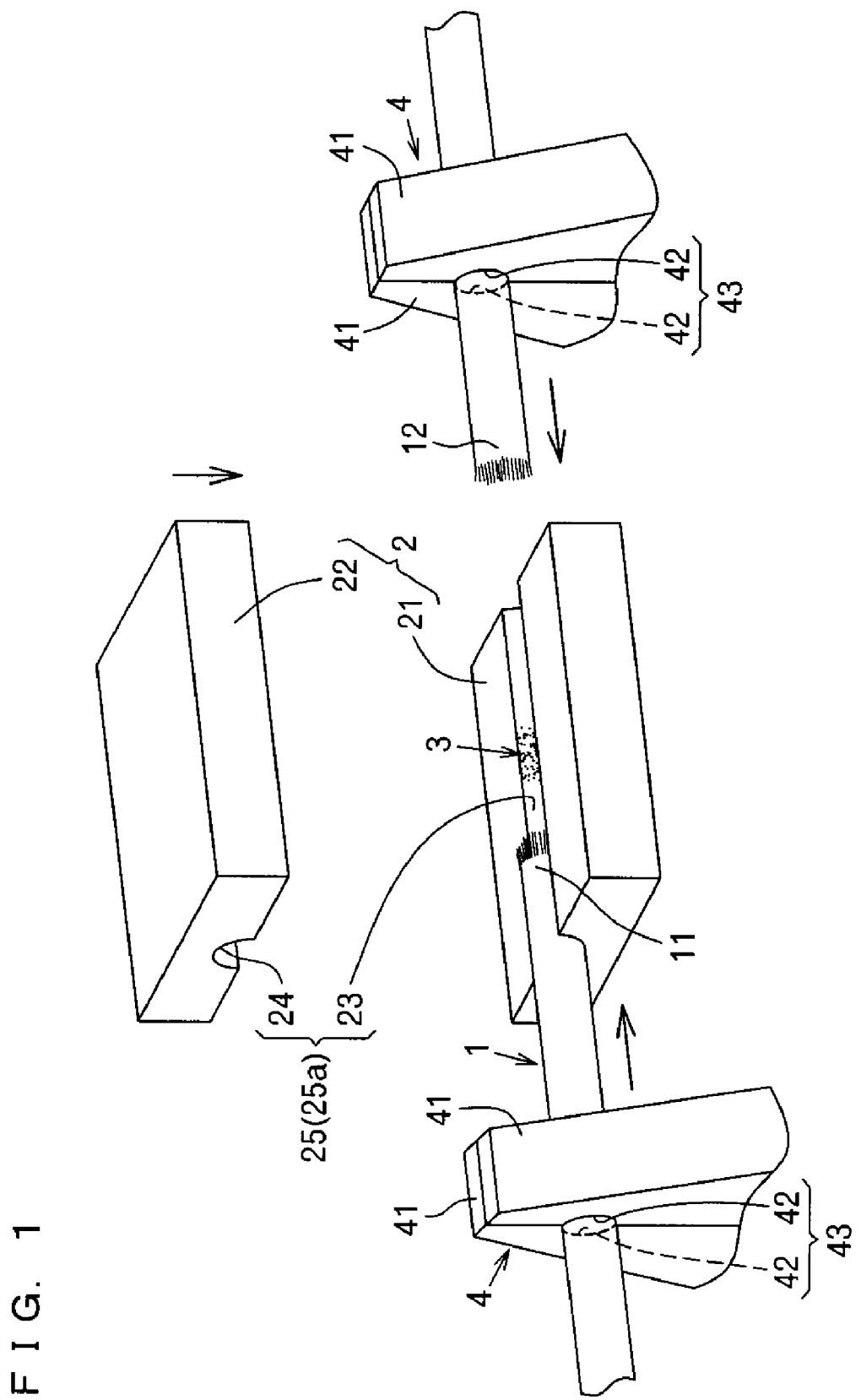
FIG. 1 is an illustrative view of a method for jointing ends of a rubbery-core-inserted braid in a first embodiment.
Figure 2:
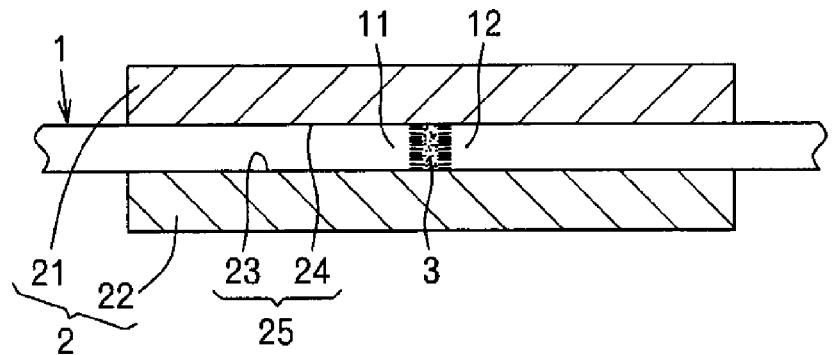
FIG. 2 is a sectional view of a mold when ends of a rubbery-core-inserted braid and a thermoplastic resin are inserted into the mold.

Illustrated in FIGS. 1 and 2

In the present embodiment, a two-part mold (2), which can be divided into upper and lower mold parts, is used to joint ends of a rubbery-core-inserted braid (1) to each other.

The mold (2) functions to heat and melt a thermoplastic resin (3), which will be detailed later, for jointing the ends of the rubbery-core-inserted braid (1), or a thermoplastic resin in a mixture containing a thermoplastic resin and an adhesive, and also functions to decide the external shape of the end-jointed region.

The mold (2) is composed of two rectangular templates (21) and (22) arranged substantially horizontally. In opposite surfaces of the two templates (21) and (22), straight trenches (23) and (24) each having a semicircular cross section are made, respectively.

When the templates (21) and (22) are closed, the two trenches (23) and (24) constitute a through hole (25). The through hole (25) is horizontally extended. It is advisable to decide the size of the through hole (25), that is, the size of the trenches (23) and (24) appropriately in accordance with the thickness of the rubbery-core-inserted braid (1) in such a manner that the ends of the rubbery-core-inserted braid (1) are to be jointed to each other can be tightly fitted into the through hole (25).

The two templates (21) and (23) each have, therein, a heater (not illustrated) for heating the center of the trench (23) or (24) at a temperature at least the melting point of the thermoplastic resin (3), which will be detailed later.

The raw material of the templates (21) and (22) is desirably a material excellent in thermal conductivity.

Figure 5:
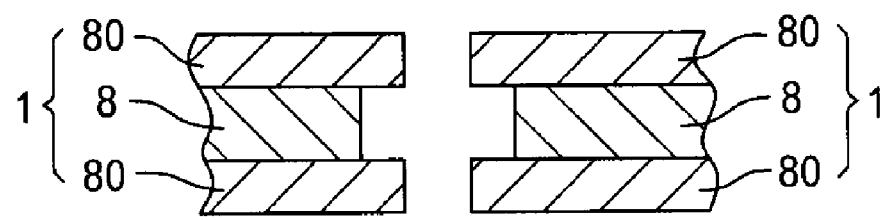
FIG. 5 is a sectional view of a rubbery-core-inserted braid in the prior art.

The rubbery-core-inserted braid (1) is a known braid (see FIG. 5), wherein a covering braid (80) is formed around a rubbery core (8) to which a slight tension is applied. When the braid (1) is cut with scissors or a cutter, the rubbery core (8) shrinks somewhat. Accordingly, in each of the cut end faces of the rubbery-core-inserted braid (1), the rubbery core (8) is slightly dented from the covering braid (80) so that the covering braid (80) tends to be fluffed and slightly swelled.

In the embodiment, the raw material of the covering braid is a synthetic resin such as nylon.

Of course, the present invention may be carried out not only in the case of jointing both ends (11) and (12) of the single rubbery-core-inserted braid (1) to each other to form a ring but also in the case of jointing an end (11) of a rubbery-core-inserted braid and an end (12) of another rubbery-core-inserted braid to each other so as to be made into a single unit.

When the ends of the rubbery-core-inserted braid (1) are jointed to each other, a pinching tool (4) is used to hold the rubbery-core-inserted braid (1). The pinching tool (4) has two opening-and-closing pieces (41) and (41), which can be closed toward each other and can be separated from each other. In opposite surfaces of both the opening-and-closing pieces (41) and (41), semicircular trenches (42) and (42) are made, respectively. When the opening-and-closing pieces (41) and (41) are closed toward each other, both the semicircular trenches (42) and (42) constitute a through hole (43), the diameter of which is slightly smaller than the thickness of the rubbery-core-inserted braid (1).

The rubbery-core-inserted braid (1) is inserted between the opening-and-closing pieces (41) and (41) in an opened state, so as to correspond to the positions of the semicircular trenches (42) and (42). When the opening-and-closing pieces (41) and (41) are closed toward each other, the rubbery-core-inserted braid (1) is pressed by means of the inner surface of the through hole (43). Thus, even when the rubbery-core-inserted braid (1) is somewhat pulled out, the rubbery-core-inserted braid (1) is not slipped out therefrom.

Examples of the thermoplastic resin (3) used to joint the ends of the rubbery-core-inserted braid (1) include polyamides, polyesters, polyolefins, polyvinyl alcohols, polyurethanes, and other materials that are each used as synthetic fiber material in many cases. The melting point thereof is lower than that of the covering braid (80) of the rubbery-core-inserted braid (1).

In the present embodiment, the thermoplastic resin (3) is made into powdery form. However, the resin (3) may be in a granular form, a pellet form or a plate piece form.

When the thermoplastic resin (3) or the mixture is made into a powdery or granular form, the thermoplastic resin (3) is melted in a short time and the adhesion workability is improved. When the thermoplastic resin (3) or the mixture is made into a pellet or plate piece form, the resin or the mixture is more easily handled than the resin in a powdery or granular form.

The amount of the thermoplastic resin (3) is an amount necessary and sufficient for the following: the thermoplastic resin (3) is melted to penetrate into both the ends (11) and (12) of the rubbery-core-inserted braid (1). Additionally, the amount is such an amount that when the melted resin is solidified, the resin is inconspicuous.

If the amount of the thermoplastic rein (3) is too large, the end-jointed region of the rubbery-core-inserted braid (1) is conspicuous or the end-jointed region becomes too hard.

Jointing Method

As illustrated in FIG. 1, the mold (2) is opened, and the end (11) of the rubbery-core-inserted braid (1) is fitted into the trench (23) in the lower template (21). The other end (12) of the rubbery-core-inserted braid (1) or the end (12) of another rubbery braid is fitted into the trench (23). Both the ends (11) and (12) of the rubbery-core-inserted braid (1) are caused to approach each other, and further the thermoplastic resin (3) is interposed between both the ends (11) and (12).

As illustrated in FIG. 2, the mold (2) is closed. While the ends (11) and (12) of the rubbery-core-inserted braid (1) are pushed against each other so as to approach each other, the thermoplastic resin (3) is heated to be melted.

When the work is made in a state where the ends (11) and (12) of the rubbery-core-inserted braid (1) are pinched with the pinching tool (4) (or between the opening-and-closing pieces 41 and 41), excellent workability is exhibited and safety is kept.

When the mold (2) is closed, the fluffs of the covering braid moiety of the rubbery-core-inserted braid (1) should not be sandwiched between the partitioning faces of the mold (2).

If the fluffs of the covering braid (80) are sandwiched in a large amount between the portioning faces of the mold (2), the mold (2) is not completely closed so that the melted resin remains as a burr or flash. This invalidates the commercial value of the product. Thus, the fluffs of the covering braid (80) should not be sandwiched.

In a state where the ends (11) and (12) of the rubbery-core-inserted braid (1) are pushed against each other to approach each other, the thermoplastic resin (3) is melted; therefore, the melted resin is certainly filled into the gap between the ends (11) and (12) to penetrate into the ends (11) and (12) of the rubbery-core-inserted braid (1). In this way, the penetration of the melted resin into the ends (11) and (12) is forcibly conducted, so that the strength of the end-jointed region can be made high.

The gap between the ends (11) and (12) of the rubbery-core-inserted braid (1) is surrounded by a circumferential wall (25a) of the through hole (25) in the mold (2). Thus, the melted resin is never forced out.

The mold (2) is opened and the rubbery-core-inserted braid (1) is taken out. When the resin in the end-jointed region is completely solidified, the jointing of the ends (11) and (12) of the rubbery-core-inserted braid (1) to each other is completed.

Second Embodiment

Figure 3:
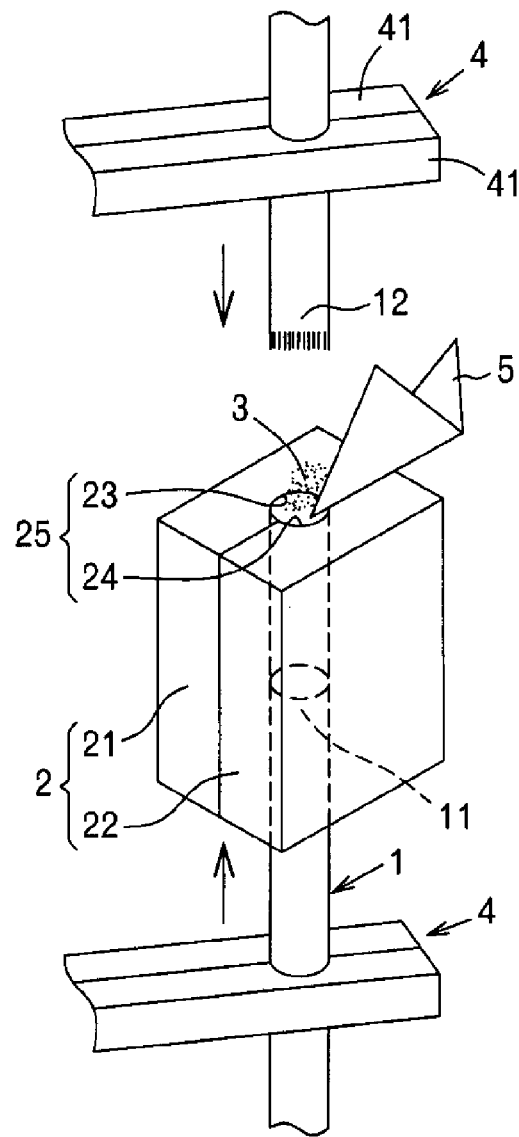
FIG. 3 is an illustrative view of a method for jointing ends of a rubbery-core-inserted braid in a second embodiment.
Figure 4:
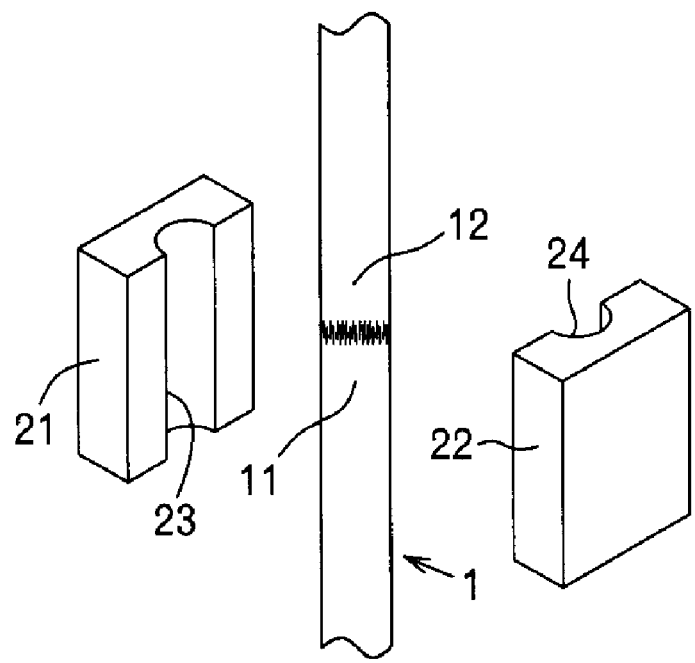
FIG. 4 is a perspective view of a mold when the mold is opened.

Illustrated in FIGS. 3 and 4

The two-part mold (2) is used in a state where the through hole (25) therein is vertically arranged.

The end (11) of the rubbery-core-inserted braid (1) is inserted into the through hole (25) in the mold (2) from the bottom of the hole into the middle thereof. A slight resistance may be generated; however, the insertion can easily be attained by pinching the rubbery-core-inserted braid (1) with the pinching tool (4) and then pushing the braid (1) into the hole.

Next, the thermoplastic (3) is charged into the through hole (25) in the mold (2) from the above. When the thermoplastic resin (3) is in a powdery or granular form, the resin (3) can be charged without being left by the use of a twice-folded sheet (5).

Next, the end (12) of the rubbery-core-inserted braid (1) is inserted into the through hole (25) from the above.

In a state where the ends (11) and (12) of the rubbery-core-inserted braid (1) are pushed against each other so as to approach each other, the thermoplastic resin (3) is heated to be melted.

The mold (2) is opened and the rubbery-core-inserted braid (1) is taken out. When the resin in the end-jointed region is completely solidified, the jointing of the ends (11) and (12) of the rubbery-core-inserted braid (1) is completed.

When the ends (11) and (12) of the rubbery-core-inserted braid (1) are inserted into the through hole (25) in the closed mold as in the present embodiment, the following advantages are produced:

Supposed is the case of opening the mold (2), fitting the ends (11) and (12) into the through hole (25), charging the thermoplastic resin (3) or the like thereinto, and then closing the mold (2). When the thermoplastic resin (3) in this case is in a powder or granular form, the thermoplastic resin (3) or the like overflows from the trench (23) so as to be forced out from the trench (23). As a result, there is a fear that an inconvenience is caused for closing the mold (2) or that the resin or the like remains as a burr or flash in the gap between the closed mold parts at the region where the ends (11) and (12) are jointed to each other, so that the commercial value of the resultant may be damaged.

Furthermore, the fluffs of the ends (11) and (12) are sandwiched between the partitioning faces of the mold (2), so that the melted resin invades the gap between the partitioning faces. Thus, there is also a fear that the resin may unfavorably remain a burr or flash.

In the present embodiment, the thermoplastic resin (3), or the mixture of a thermoplastic resin and an adhesive is charged into the through hole (25) in a state where the mold (2) is closed. Therefore, the thermoplastic resin (3) or the mixture can be prevented from being supplied into the region where the supply thereof causes an obstacle to the closing of the mold (2). Thus, the above problem is not caused.

Moreover, the rubbery-core-inserted braid (1) is inserted into the through hole (25) from the lower of the hole (25) to block the bottom of the hole (25) while the thermoplastic resin (3) or the mixture is charged, in a predetermined amount, into the through hole (25) from the upper of the hole (25). For this reason, the thermoplastic resin (3) or the mixture can be prevented from spilling to regions where the thermoplastic resin (3) or the like is unnecessary, or from being forced out to cause any inconvenience.

Third Embodiment

In the first and second embodiments, a mixture of an adhesive and a thermoplastic resin is used instead of the thermoplastic resin (3).

In the heating step, the thermoplastic resin in the mixture melts and penetrates into the ends (11) and (12) so that the ends can be intensely jointed to each other.

In this embodiment, 5 g of powder of a thermoplastic resin was blended with 20 g of a cyanoacrylate instantaneous adhesive, and the blend was solidified into a form of a plate having a thickness of 0.5 to 0.7 mm. This was punched out into a form of small discs each corresponding to the outside diameter of the rubbery-core-inserted braid, ends of which are to be jointed to each other. One of the discs was sandwiched between the ends (11) and (12) of the rubbery-core-inserted braid (1), and then the ends are jointed to each other in accordance with any one of the above embodiments.

When the mixture of the adhesive and the thermoplastic resin is in a form of a small plate, the mixture is more easily handled than when the mixture is in a powdery or granular form. Moreover, easy is also the work for interposing the mixture between the ends (11) and (12) of the rubbery-core-inserted braid (1) in the mold (2). The mixture is also prevented from being forced out from the mold.

Since the mixture is in the form of the disc, the size of which corresponds to the thickness of the rubbery-core-inserted braid (1), the mixture can be prevented from being supplied into the region where the supply thereof causes an obstacle to the closing of the mold (2). Additionally, the mixture or the adhesive can be evenly stretched onto the whole of the jointing end faces of the rubbery-core-inserted braid (1).

Fourth Embodiment

In the third embodiment, only a thermoplastic resin is used instead of the mixture of an adhesive and a thermoplastic resin. The same advantageous effects as in the third embodiment are produced.

Fifth Embodiment

As described above, the raw material of the covering braid (80) of the rubbery-core-inserted braid (1) is a synthetic resin such as nylon.

In the present embodiment, the thermoplastic resin (3), or the mixture of an adhesive and a thermoplastic resin is omitted, and the ends of the covering braid (80) are heated to be melted in a state where the ends (11) and (12) of the rubbery-core-inserted braid (1) are butted directly to each other. The melted covering braid (80) is then caused to penetrate into the ends (11) and (12) of the rubbery-core-inserted braid (1), and the melted braid (80) is solidified. In this way, the ends (11) and (12) of the rubbery-core-inserted braid (1) are jointed to each other.

In the present embodiment, the thermoplastic resin (3) or the mixture is unnecessary since the covering braid (80) of the rubbery-core-inserted braid (1) is melted and then caused to penetrate into the ends (11) and (12) of the rubbery-core-inserted braid (1).

Besides, a labor is also unnecessary for selecting an adhesive or thermoplastic resin suitable for the raw material of the rubbery-core-inserted braid (1) since the covering braid (80) is melted and then the ends of the rubbery-core-inserted braid (1) are jointed to each other.

When the covering braid (80) is heated to be melted, it is desired that both the ends (11) and (20) are pushed and pressed so as to cause the ends (11) and (12) to approach each other. This is because the penetration of the melted resin into the ends (11) and (12) is forcibly attained as described above, so that the strength of the end-jointed region can be made high.

When the raw material of the covering braid is nylon, it is advisable to set the heating temperature to about 180° C.

What is claimed is:

1. A method for jointing a rubbery-core-inserted braid consisting of an inner rubbery core and an outer covering braid that covers the inner rubbery core and is made of synthetic resin fibers, comprising:
    a step of causing ends of the rubbery-core-inserted braid to approach each other, thereby making the ends opposite to each other,
    a step of interposing a thermoplastic resin, or a mixture of a thermoplastic resin and an adhesive between both the ends, and
    a step of heating and melting the thermoplastic resin, or the thermoplastic resin in the mixture in a state where a circumferential wall corresponding to the contour of end faces of the rubbery-core-inserted braid stretches over the ends of the rubbery-core-inserted braid to surround the ends, causing the melted resin to penetrate into the ends of the rubbery-core-inserted braid, and solidifying the melted resin, thereby jointing the ends of the rubbery-core-inserted braid to each other.

2. The method for jointing the rubbery-core-inserted braid according to claim 1, which is performed in a state where both the ends of the rubbery-core-inserted braid, and the thermoplastic resin or mixture are sealed in a through hole into which the rubbery-core-inserted braid is tightly fitted, the hole being made in a mold.

3. A method for jointing a rubbery-core-inserted braid consisting of an inner rubbery core and an outer covering braid that covers the inner rubbery core and is made of synthetic resin fibers, comprising:
    a step of preparing a mold made of a pair of templates, in which the templates may be closed in such a manner that trenches which are respectively made in inner faces of both the templates can constitute a through hole into which the rubbery-core-inserted braid is tightly finable, and
    fitting an end of the rubbery-core-inserted braid into the trench in one of the templates while fitting the other end of the rubbery-core-inserted braid or an end of another rubbery-core-inserted braid into the trench, thereby causing both the ends of the rubbery-core-inserted braid (s) to approach each other,
    a step of interposing a thermoplastic resin or a mixture of a thermoplastic resin and an adhesive between both the ends, and
    a step of heating and melting the thermoplastic resin, or the thermoplastic resin in the mixture in a state where the mold is closed, causing the melted resin to penetrate into the ends of the rubbery-core-inserted braid, and solidifying the melted resin, thereby jointing the ends of the rubbery-core-inserted braid(s) to each other.

4. The method for jointing the rubbery-core-inserted braid according to claim 1, wherein the thermoplastic resin, or the thermoplastic resin in the mixture is heated and melted in a state where the ends of the rubbery-core-inserted braid are pushed and pressed to cause the ends to approach each other relatively.

5. The method for jointing the rubbery-core-inserted braid according to claim 1, wherein the thermoplastic resin, or the mixture of a thermoplastic resin and an adhesive is in any one of a powdery form, a granular form, a pellet form, and a small plate piece form.

6. The method for jointing the rubbery-core-inserted braid according to claim 1, wherein the thermoplastic resin, or the mixture of a thermoplastic resin and an adhesive is formed into a disc having a size corresponding to the thickness of the rubbery-core-inserted braid.

7. The method for jointing the rubbery-core-inserted braid according to claim 1, further comprising:
    forming a ring by said jointing the ends of the rubbery-core-inserted braid to each other.

8. The method for jointing the rubbery-core-inserted braid according to claim 3, further comprising:
    forming a ring by said jointing the ends of the rubbery-core-inserted braid to each other.

9. The method for jointing the rubbery-core-inserted braid according to claim 1, wherein the outer covering braid made of synthetic resin fibers is fluffed at the ends of the rubbery-core-inserted braid, and wherein the melted resin invades a gap between the end faces of the rubbery-core-inserted braid including the synthetic resin fibers fluffed at the ends of the rubbery-core-inserted braid.

* * * * *